United States Patent [19]

Lee

[11] Patent Number: 4,862,910
[45] Date of Patent: Sep. 5, 1989

[54] CHECK VALVE WITH DISC CENTERING DEVICE

[75] Inventor: Richard B. Lee, Spring, Tex.

[73] Assignee: Keystone International, Inc., Houston, Tex.

[21] Appl. No.: 252,457

[22] Filed: Sep. 30, 1988

[51] Int. Cl.⁴ .......................................... F16K 15/03
[52] U.S. Cl. ................................ 137/270; 137/527; 251/298
[58] Field of Search ................ 137/527, 527.4, 270; 251/298

[56] References Cited

U.S. PATENT DOCUMENTS 3,230,971  1/1966  Rosaen ............................. 137/527 X
3,974,855  8/1976  Webb ................................ 137/527.4

Primary Examiner—Alan Cohan
Attorney, Agent, or Firm—Browning, Bushman, Zamecki & Anderson

[57] ABSTRACT

The check valve includes a disc-shaped closure member mounted to the valve body for sealing engagement with an annular seat in the valve body. A stem is rotatably mounted to the valve body so that the closure member can swing into and out of engagement with the annular seat. The stem extends outwardly of the valve body and may be positioned on either side of the valve body so that a biasing or cushioning mechanism attached thereto may be positioned on either side of the valve body. An adjustment mechanism is provided for axially moving the stem with respect to the valve body, thereby laterally adjusting the position of the closure member with respect to the seat on the valve body to ensure reliable sealing engagement with the seat.

10 Claims, 2 Drawing Sheets

CHECK VALVE WITH DISC CENTERING DEVICE

BACKGROUND OF THE INVENTION

1. Field of the Invention

The present invention relates to check valves of the type utilizing a disc or clapper as the closure member, and more particularly, to techniques for properly aligning a disc of a check valve laterally with respect to the seat in the valve body.

2. Description of the Background

Check valves having a ring-shaped body with a central fluid passageway and a disc-shaped closure member or disc are well known and preferred for many applications. A pivot pin or stem is rotatable about the valve body, and an arm interconnects the stem with the disc or clapper. The flow of fluid through the valve swings the disc and arm about the axis of the stem to open the valve, while the lack of sufficient fluid flow through the valve in a desired direction allows the disc to swing closed in sealed engagement with the valve seat, thereby prohibiting "back flow" through the line.

Many such check valves employ a sizable mechanism on one side of the valve and interconnected with the protruding stem to control and/or cushion closure of the disc. Various spring mechanisms, counterweights, and/or hydraulic or pneumatic cylinders may be used for biasing the disc toward the closed position, and for "cushioning" the closure of the disc to minimize valve and system shock damage. These mechanisms are commonly mounted on the right-hand side of the valve (looking in the direction of the oncoming fluid flow), and often require considerable spacing for field installation.

For many applications, the right-side orientation of these cushioning mechanisms presents no problems. In some applications, however, it may be preferable or necessary that the cushioning mechanism be on the left side of the valve body to facilitate installation of the valve. For these cases, special left-hand valves are normally manufactured and sold, which satisfy the installation problems but increase manufacturing and inventory costs.

Another problem associated with disc check valves involves the technique for obtaining proper lateral positioning of the disc with respect to the valve body to insure reliable sealing when the valve is closed. As used herein, the term "lateral" means the direction perpendicular to the central axis of the valve and parallel with the valve stem. For example, with the valve stem in the upper portion of the valve body and mounted so that its axis is horizontal, side-to-side or lateral positioning of the disc with respect to the seat in the valve body is required to obtain reliable sealing. Typically this lateral positioning is obtained by centering the disc with respect to the valve seat, interconnecting the axially fixed stem and the disc arm, rotating the stem and arm to mark the desired position of the arm with respect to the disc, removing the disc and drilling holes at the marked locations for receiving studs, then returning the disc to the valve body to finish assembly. This procedure is time consuming, decreases field interchangability, and is not well adapted to cost efficient valve assembly operations.

The disadvantages of the prior art are overcome by the present invention, and improved techniques are hereinafter disclosed for reliably positioning a disc with respect to a valve body for a swing check valve, and for overcoming the problems associated with manufacturing valves with cushioning devices specifically intending to be on one side of the valve body.

SUMMARY OF THE INVENTION

A check valve includes a disc-shaped closure member typically mounted to an annular valve body and intended for sealing engagement with an annular seat in the valve body. A cylindrical-shaped stem is rotatably mounted to the valve body on a pair of sleeve bushings, and is sealed with the valve body by a packing gland. An arm is fixedly interconnected at one end to the stem, and at the other end to the disc. The cavity in the valve body for receiving the stem preferably extends through the valve body, such that the stem extension protruding from the valve body for receiving the biasing or cushioning mechanism may be positioned on either the left-side or right-side of the valve body.

A stem adjustment ring is axially fixed to the stem extension and rotatably fixed to the valve body by a pair of adjustment studs. The studs pass through clearance holes provided in either packing gland, and are threaded into the valve body. The adjustment ring is sandwiched between first and second nuts each supported on a respective one of the adjustment studs, with the first nut being rotatably fixed to the stud and the second nut being rotatable on the stud. Selective rotation of the first nut, and thus the stud, and rotation of the second nut thus controls axial movement of the adjustment ring in either direction, which in turn allows for easy lateral adjustment of the disc fixed to the stem with respect to the seat in the valve body.

The configuration of the valve body, stem, and lateral adjustment mechanism is such that the disc may be easily removed from the stem, and the stem turned end-for-end so that the extension for receiving the biasing or cushioning mechanism can be provided on the opposite side of the valve body. The manufacturing and inventory costs of providing a valve body with a special left-hand biasing or cushioning mechanism is thus avoided, since the selected biasing or cushioning member can be readily removed and positioned on either side of the valve body, and the disc then readily adjusted laterally for proper sealing alignment with the valve seat.

It is an object of the present invention to provide a reliable yet cost-effective mechanism for adjusting the axial position of a stem with respect to a valve body, thereby adjusting a lateral position of the clapper fixed to the stem with respect to a seat in the valve body.

It is another object of the invention to provide a check valve of a type having a disc for sealing engagement with a valve seat and rotatable about a stem interconnected therewith, with an extension of the stem suitable for receiving a biasing or cushioning mechanism being selectively positionable on either side of the valve.

It is a feature and advantage of the present invention that manufacturing and inventory costs are reduced by providing a versatile yet reliable swing check valve, including a readily accessible adjustment mechanism for selectively adjusting the lateral position of the disc with respect to the valve body.

These and other objects, features, and advantages of the present invention will become apparent from the following detailed description, wherein reference is made to figures in the accompanying drawings.

DETAILED DESCRIPTION OF PREFERRED OF PREFERRED EMBODIMENTS

Figure 1:
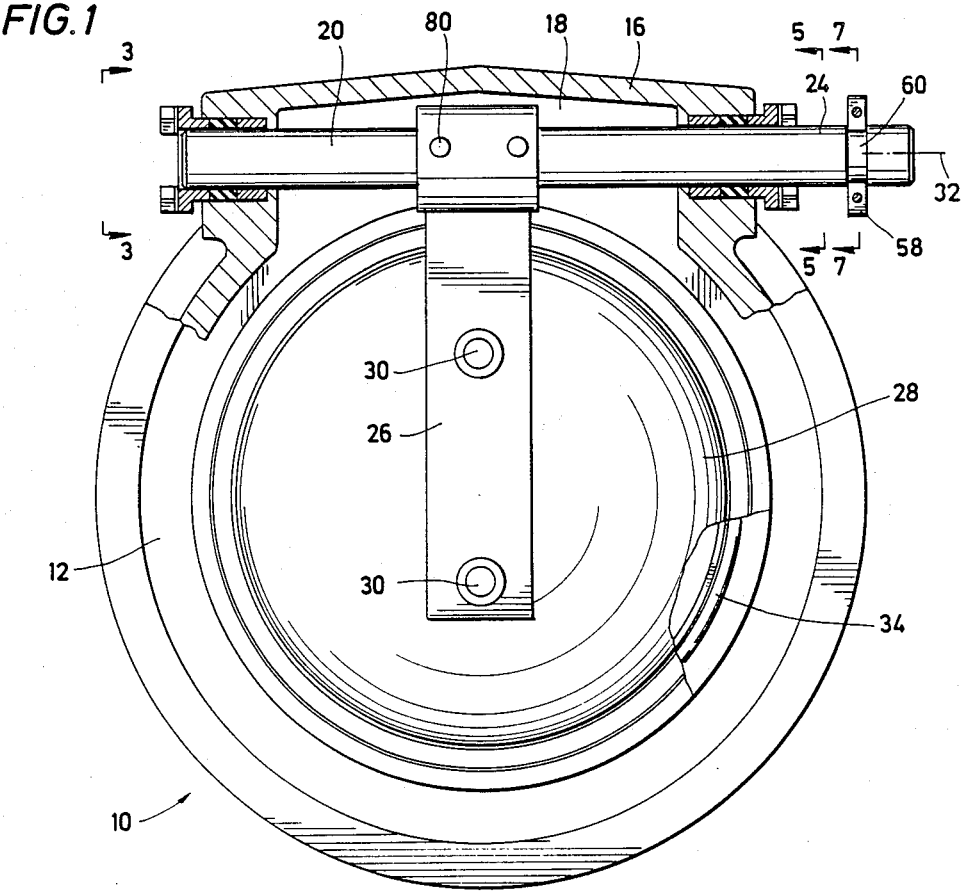
FIG. 1 is an end view, partially in cross-section, of a suitable valve according to the present invention with the adjustment studs removed for clarity.

The valve 10 shown in FIG. 1 includes a ring-shaped valve body 12 with a fluid passageway formed about the central axis of the valve. An upper portion 16 of the valve body defines a cavity 18 for receiving a stem 20 rotatably mounted in the valve body 12. Each side of the valve body includes a generally cylindrical passageway 22 (see FIGS. 4 and 6) extending through the valve body for receiving the stem. The stem 20 shown in the figures and described herein has a stem extension 24 on the right-hand side of the valve, although the stem may be removed and replaced, as explained subsequently, so that the extension 24 is on the left-hand side of the valve.

Disc arm 26 is fixedly interconnected at one end to the stem 20, and at the other end is fixed to the disc 28 by a pair of studs and nuts 30. Accordingly, the disc, disc arm and stem rotate about the axis 32 of the stem to raise the disc and allow fluid flow through the valve, and to lower the disc into sealed engagement with the annular seat 34 in the valve body.

Figure 2:
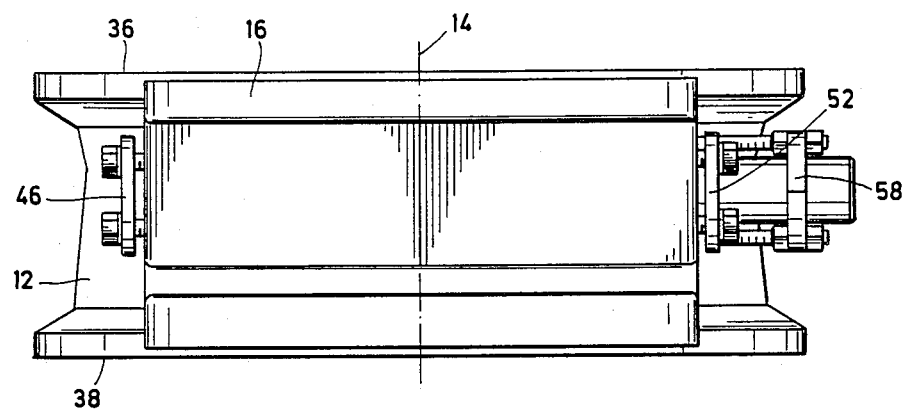
FIG. 2 is a top view of the valve shown in in FIG. 1.

Referring to FIG. 2, the valve 10 is a wafer-type valve, and accordingly the valve body defines a pair of opposing planar surfaces 36, 38 for sealing engagement with flanges (not shown) of a pipeline. The general geometry of the valve body is, however, not critical to the present invention, since the concepts described herein may be used with various styles of valve bodies having a disc-shaped closure member rotatable about a stem for swinging into and out of engagement with the valve seat.

Figure 3:
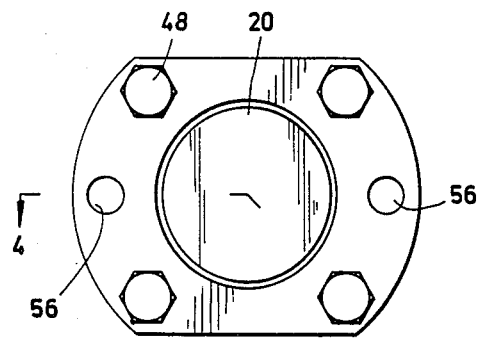
FIG. 3 is an end view taken along line 3—3 in FIG. 1 of a packing gland and stem.
Figure 5:
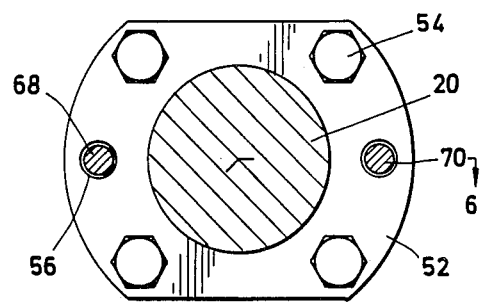
FIG. 5 is a cross-sectional view taken along line 5—5 in FIG. 1 of the stem and packing gland.
Figure 4:
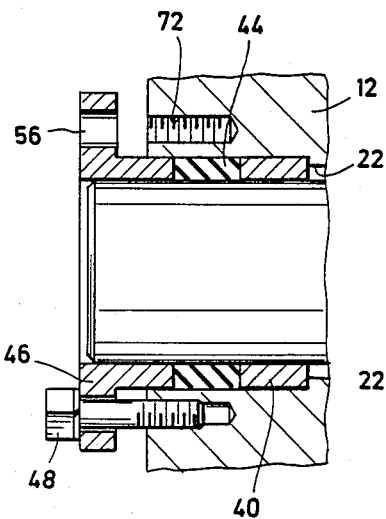
FIG. 4 is a cross-sectional view taken along line 4—4 in FIG. 3.
Figure 6:
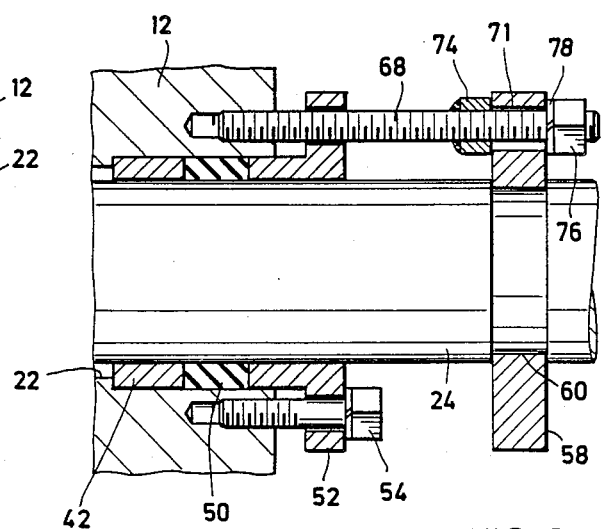
FIG. 6 is a cross-sectional view taken along line 6—6 in FIG. 5.

Referring now to FIGS. 1, 4 and 6, a fixed radial position of the stem axis with respect to the valve body is preferably maintained by a pair of conventional sleeve bushings 40, 42 provided on each side of the valve body. Sealing engagement between the left side of the valve body and the stem 20 is obtained by packing 44 held in place by gland 46, which in turn is connected to the body by a plurality of bolts 48. Similarly, the right side of the valve is sealed with the stem 20 by packing 50, gland 52, and bolts 54. It is a feature of the present invention, as explained subsequently, that the sealing mechanism between the stem and the left and right sides of the valve be structurally identical. Each of the packing glands may thus be provided with a pair of clearance holes 56 as shown in FIGS. 3 and 5.

Figure 7:
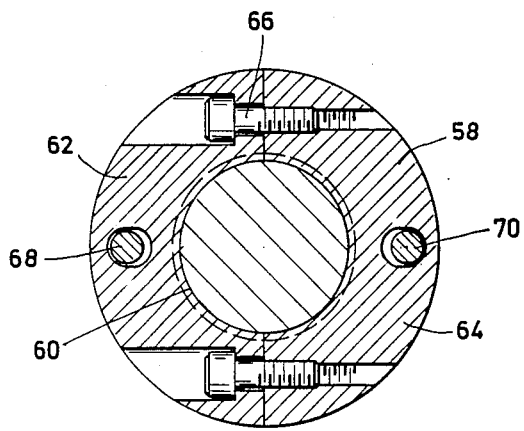
FIG. 7 is a cross-sectional view taken along line 7—7 in FIG. 1.

Referring to FIGS. 1 and 6, an adjustment ring 58 is axially fixed on the stem extension 24. An annular groove 60 is provided in the shaft extension, although the OD of the groove is less than the ID of the adjustment ring 58 (see FIG. 6), so that the stem 20 can freely rotate with respect to the ring 58. The adjustment ring 58 may be formed from donut halves 62, 64 secured together as shown in FIG. 7 by conventional bolts 66.

Referring to FIGS. 5 and 6, a pair of adjustment studs 68, 70 are provided on radially opposing sides of the stem 20 and pass freely through corresponding clearance holes 56 in the packing gland 52, and through similar but slotted holes 71 in the adjustment ring 58. Each side of the valve body 12 is preferably provided with identical threaded ports 72 (see FIG. 4) for receiving respective studs 68 and 70, and gland bolts 48, 54. A first nut 74 is fixed on the stud 68, e.g. by welding, and a second nut 76 is threaded on the stud 68 and held in place by a conventional lock washer 78. The adjustment ring 58 is thus sandwiched between the nuts 74, 76 as shown in FIG. 6 so that the selected axial position of the stem 20 with respect to the valve body is fixed against inadvertent movement, while the stem 20 is free to rotate within the adjustment ring 58 which is fixedly interconnected to the valve body 12, thereby allowing for normal operation of the check valve.

During or subsequent to assembly of the valve 10, lateral adjustment of the disc 28 with respect to the valve body may be obtained to provide reliable sealing engagement between the disc and the seat 34. If it is desired to move the disc 28 laterally toward the left-hand side of the valve, nut 74 on both studs 68 and 70 may be rotated, thereby moving the adjustment ring 58 closer to the valve body and axially moving the stem 20 and thus the interconnected disc 28. If it is desired to move the disc 28 laterally toward the right-hand side of the valve, the nut 74 may similarly be rotated to move the adjustment ring 58 further away from the valve body. After rotating the nuts 74 and thus the studs 68, 70 to their desired position, the nut 76 on each of the studs is re-tightened to fix the axial position of the stem 20 with respect to the valve body, and thus fix the disc 28 to prevent inadvertent lateral movement with respect to the seat.

It may be desirable to change the valve from a right-side biasing/cushioning device valve to a left-side biasing/cushioning device valve, or vice versa. This may be easily accomplished, either in the field or at the factory, by removing the bolts 80 (see FIG. 1) which structurally interconnect the disc arm 26 and the stem 20. The studs 68, 70 may then be unthreaded from the valve body, and the packing glands 46, 52 removed so that the stem 20 may be completely withdrawn from the valve body and reinserted in the opposite side of the valve. The packing glands may then be reassembled and studs 68, 70 threaded into the valve body (the ports 72 having already been provided in each side of the valve body). Lateral adjustment of the disc with respect to the seat on the valve body may be easily obtained as described above. The conventional biasing cushioning mechanism may then be reinstalled on the opposite side of the valve body and reconnected to the shaft extension 24 in conventional fashion.

Various modifications may be made without departing from the spirit and scope of the present invention. As an example, each of the adjustment studs may be provided with a right-hand thread at one end and a left-hand thread at the other end, with the one end being threaded to the valve body and the other end being received within a threaded passageway in the adjustment ring, so that rotation of the adjustment nut will move the adjustment ring and thus the stem 20 as described above. The adjustment ring may be interconnected with the stem extension 24 by various techniques other than that shown in FIG. 7. For example, a pair of Spirolox brand or Truarc brand retaining rings may be used to axially fix a ring to the stem while allowing free rotation of the ring on the stem.

These and other modifications will be suggested to those skilled in the art based upon the above description of the invention. It should be understood that such changes and modifications are fully within the scope and spirit of the present invention, which is not restricted to the particular embodiments described herein.

What is claimed is:

1. A check valve, comprising:
    an annular valve body having a fluid flow passageway;
    an annular seat positioned on the valve body radially exterior of the fluid flow passageway;
    a disc postionable over the passageway for sealing engagement with the annular seat when the valve is in its closed position;
    a stem rotatably mounted within the valve body and having an extension portion protruding outwardly from the valve body;
    a disc arm connected at one end of the stem and at the other end of the disc, such that the disc may swing out of engagement with the seat when the valve is in its open position; and
    an adjustable mechanism interconnected with the extension portion and positioned substantially external of the valve body for selectively moving and resetting the axial position of the stem with respect to the valve body and thereby laterally adjusting the disc with respect to the valve body for reliable sealing engagement with the seat, the adjustment mechanism including an adjustment ring axially fixed and rotatable with respect to the extension portion of the stem, and at least one stud threadably connected between the valve body and the adjustment ring and rotatable for varying the axial position of the adjustment ring with respect to the valve body.

2. A check valve as defined in claim 1, wherein the extension portion includes an annular groove, and the adjustment ring further comprises:
    a first donut half for fitting within the groove on the stem extension portion;
    a second donut half for fitting within the groove on the stem extension portion; and
    a locking member for securing the first and second donut halves together about the stem extension portion.

3. A check valve as defined in claim 1, further comprising:
    the valve body including a through passageway for receiving the stem;
    a left-side sealing member for sealing engagement between a left-side of the valve body and the stem;
    a right-side sealing member for sealing engagement between a right-side of the valve and the stem; and
    the stem including a stem extension portion protruding from either the left-side or right-side of the valve body, such that the stem may be removed from the valve body and the stem extension portion positioned on the opposite side of the valve body with the stem in sealing engagement with the left-side sealing member and the right-side sealing member.

4. A check valve as defined in claim 1, further comprising:
    a left-side sealing member for sealing engagement between a left-side of the valve body and the stem;
    a right-side sealing member for sealing engagement between a right-side of the valve body and the stem:
    a left-side packing gland for retaining the left-side sealing member in sealing engagement and having at least one through passageway for receiving the at least one stud; and
    a right-side packing gland for retaining the right-side sealing member in sealing engagement and having at least one through passageway for receiving the at least one stud.

5. A check valve as defined in claim 4, further comprising:
    a left-side sleeve positionable in the valve body between the left side sealing member and the arm for receiving the stem; and
    a right-side sleeve positionable in the valve body between the right-side sealing member and the arm for rotatably receiving the stem.

6. A check valve, comprising:
    annular valve body means having a fluid flow passageway;
    annular seat means positioned on the valve body means radially exterior of the fluid flow passageway;
    disc means positionable over the passageway for sealing engagement with the annular seat means when the valve is in its closed position;
    stem means rotatably mounted within and protruding outwardly from the valve body means;
    disc arm means connected at one end to the stem means and at the other end to the disc means, such that the disc means may swing out of engagement with the seat means when the valve is in its open position; and
    adjustment means external to the valve body means and interconnected between the stem means and the valve body means for selectively moving and resetting the axial position of the stem means with respect to the valve body and thereby laterally adjusting the disc means with respect to the valve body means for reliable sealing engagement with the seat means, the adjustment means including an adjustment ring axially fixed and rotatable with respect to the stem means, and at least one stud threadable connected between the valve body means and the adjustment ring and rotatable for varying the axial position of the adjustment ring with respect to the valve body means.

7. A check valve as defined in claim 6, wherein the stem means includes an annular groove, and the adjustment ring further comprises:
    a first donut half for fitting within the groove on the stem extension portion:
    a second donut half for fitting within the groove on the stem extension portion; and
    a locking member for securing the first and second donut halves together about the stem means.

8. A check valve as defined in claim 6, further comprising:
    the valve body means including a through passageway for receiving the stem means; and
    the stem means including a stem extension portion protruding from either the left-side or right-side of the valve body means, such that the stem means may be removed from the valve body means and the stem extension portion positioned on the opposite side of the valve body means.

9. A check valve, comprising:

an annular valve body having a fluid flow passageway and a through passageway;

an annular seat positioned in the valve body radially exterior of the fluid flow passageway;

a disc positionable over the passageway for sealing engagement with the annular seat when the valve is in its closed position;

a stem rotatably mounted within the valve body and protruding from either the left-side or right-side of the valve body, such that the stem protrusion may be selectively positioned on either the left-side or right-side of the valve body;

a disc arm connected at one end to the stem and at the other end to the disc, such that the disc way swing out of engagement with the seat when the valve is in its open position; and an adjustable mechanism interconnected with the stem protrusion for selectively moving and resetting the axial position of the stem with respect to the valve body and thereby laterally adjusting the disc with respect to the valve body for reliable sealing engagement with the seat, the adjustment mechanism including an adjustment ring axially fixed and rotatable with respect to the stem protrusion, and at least one stud threadably connected between the valve body and the adjustment ring and rotatable for varying the axial position of the adjustment ring with respect to the valve body.

10. A check valve as defined in claim 9, wherein the extension portion includes an annular groove, and the adjustment ring further comprises:

a first donut half for fitting within the groove on stem extension portion;

a second donut half for fitting within the groove on the stem extension portion; and a locking member for securing the first and second donut halves together about the stem extension portion.

* * * * *

UNITED STATES PATENT AND TRADEMARK OFFICE
CERTIFICATE OF CORRECTION

PATENT NO. : 4,862,910

DATED : September 5, 1989

INVENTOR(S) : Richard B. Lee

It is certified that error appears in the above-identified patent and that said Letters Patent is hereby corrected as shown below:

In Column 5, line 29, delete "adjustable" and insert therefor --adjustment--.

In Column 8, Line 16, after "on" insert therefor --the--.

Signed and Sealed this

Twenty-fourth Day of July, 1990

Attest:

HARRY F. MANBECK, JR.

*Attesting Officer*   *Commissioner of Patents and Trademarks*